(12) United States Patent
Barton et al.

(10) Patent No.: US 10,156,363 B2
(45) Date of Patent: Dec. 18, 2018

(54) COMPACT MULTI-PIECE SPRING-LOADED CROSSFIRE TUBE

(71) Applicant: General Electric Company, Schenectady, NY (US)

(72) Inventors: Jesse Ellis Barton, Fountain Inn, SC (US); Eric Hamann, Greenville, SC (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 15/214,751

(22) Filed: Jul. 20, 2016

(65) Prior Publication Data

US 2018/0023813 A1    Jan. 25, 2018

(51) Int. Cl.
   F23R 3/48        (2006.01)
   F02C 7/26        (2006.01)
   F23R 3/60        (2006.01)
   F23C 6/02        (2006.01)
   F02C 3/04        (2006.01)

(52) U.S. Cl.
   CPC .................. *F23R 3/48* (2013.01); *F02C 3/04* (2013.01); *F02C 7/26* (2013.01); *F23C 6/02* (2013.01); *F23R 3/60* (2013.01); *F05D 2220/32* (2013.01); *F05D 2240/35* (2013.01); *F05D 2260/30* (2013.01)

(58) Field of Classification Search
   CPC ...... F23C 6/02; F23R 3/02; F23R 3/48; F23R 3/60; F23R 2900/00017
   See application file for complete search history.

(56) References Cited

U.S. PATENT DOCUMENTS

| 2,832,195 | A |   | 4/1958  | Weissborn, Jr. |              |
|-----------|---|---|---------|----------------|--------------|
| 5,603,531 | A | * | 2/1997  | Maier          | F02K 1/80    |
|           |   |   |         |                | 285/145.1    |
| 5,964,250 | A | * | 10/1999 | Mueller        | F23R 3/48    |
|           |   |   |         |                | 138/109      |
| 6,334,294 | B1| * | 1/2002  | Belsom         | F23R 3/48    |
|           |   |   |         |                | 60/39.37     |
| 6,606,865 | B2|   | 8/2003  | Tilson         |              |
| 9,335,052 | B2|   | 5/2016  | DiCintio       |              |
| 2011/0067406 | A1 | * | 3/2011 | Widener     | F23R 3/48    |
|           |   |   |         |                | 60/754       |

(Continued)

FOREIGN PATENT DOCUMENTS

EP         2955447 A1    12/2015

*Primary Examiner* — Scott Walthour
(74) *Attorney, Agent, or Firm* — Dority & Manning, P.A.

(57) ABSTRACT

A crossfire tube assembly is positioned between adjacent combustors, the crossfire tube assembly having a primary body made up of a first telescoping sleeve slidably engaged with a second telescoping sleeve. An interlocking raceway is configured to limit axial travel length of the telescoping sleeves and lock the telescoping sleeves to each other. A bias is positioned between the first telescoping sleeve and the second telescoping sleeve. First and second floating collars are removably disposed to the first and second telescoping sleeves at a first and second floating collar annulus. First and second liner collars are disposed between the first and second floating collars on the first and second combustors. The crossfire tube assembly is adapted to provide fluid communication from the first combustor to the second combustor serving a gas turbine.

17 Claims, 6 Drawing Sheets

(56) References Cited

U.S. PATENT DOCUMENTS

| | | | |
|---|---|---|---|
| 2014/0123619 A1* | 5/2014 | DiCintio | F23R 3/48 60/39.37 |
| 2014/0137536 A1 | 5/2014 | Cloninger et al. | |
| 2014/0144122 A1* | 5/2014 | Overby | F23R 3/48 60/39.37 |

* cited by examiner

COMPACT MULTI-PIECE SPRING-LOADED CROSSFIRE TUBE

FIELD OF THE DISCLOSURE

This disclosure relates generally to a crossfire tube assembly between adjacent combustors, and more specifically to a compact multi-piece spring-loaded crossfire tube suitable for use in tight gas turbine equipment arrangements.

BACKGROUND OF THE DISCLOSURE

The combustion section of a gas turbine typically includes multiple combustors annularly arranged between the compressor section and the turbine section. A casing generally surrounds each combustor to contain the compressed working fluid flowing to each combustor, and one or more nozzles supply fuel to mix with the compressed working fluid before the mixture flows into a combustion chamber downstream from the nozzles. A liner circumferentially surrounds the combustion chamber to define at least a portion of the combustion chamber, and a flow sleeve may circumferentially surround at least a portion of the liner to define an annular plenum between the flow sleeve and liner through which the compressed working fluid may flow before entering the combustion chamber. An ignition device, such as a spark plug, may be used to initiate combustion in one combustion chamber, and one or more crossfire or crossover ignition tubes may be used to spread the combustion to adjacent combustors. For example, a crossfire tube may extend through the liner, flow sleeve, and casing of adjacent combustors to allow the combustion in one combustor to propagate to the adjacent combustor and to ensure substantially simultaneous ignition and equalized pressure in all combustor chambers of the gas turbine engine Even though the crossfire tubes can be effective at propagating combustion between adjacent combustors, the assembly and/or location of the crossfire tubes may have one or more disadvantages. For example, internal crossfire tubes as disclosed herein avoid many of the location disadvantages associated with surrounding flow conditions and leakage. Also, installation and removal of the crossfire tubes as disclosed herein is simplified and may avoid damage to the crossfire tubes.

Additionally, the adjacent combustors may be assembled as a module that is inserted as a whole into a combustor structure. Assembly in this manner may limit the retention methods that are commonly required for cross-fire tubes having a relatively rigid construction or one of limited flexibility to accommodate the insertion of the module into the combustor structure, as at least a portion of the cross-fire tube is typically disposed in the space that is to receive the module. Furthermore, installation of the crossfire tube requires proper positioning of the cross-fire tube, relative to other components, with the positioning left to an installation operator's discretion or manipulating, thereby often leading to human error.

BRIEF DESCRIPTION OF THE DISCLOSURE

Aspects and advantages of the disclosure will be set forth in part in the following description, or may be obvious from the description, or may be learned through practice of the disclosure.

One embodiment of the invention has a crossfire tube assembly between adjacent combustors, the crossfire tube assembly having a primary body made up of a first telescoping sleeve slidably engaged with a second telescoping sleeve that defines axial and circumferential relative movement of the telescoping sleeves. An interlocking raceway is configured to limit axial travel length of the telescoping sleeves and also configured to lock the telescoping sleeves to each other. A bias is positioned between the first telescoping sleeve and the second telescoping sleeve. A first floating collar is removably disposed to the first telescoping sleeve at a first floating collar annulus, and a second floating collar is removably disposed to the second telescoping sleeve at a second floating collar annulus. A first liner collar is disposed between the first floating collar and a first liner of a first combustor, and a second liner collar disposed between the second floating collar and a second liner of a second combustor. The crossfire tube assembly is adapted to provide fluid communication from the first combustor to the second combustor.

Another embodiment of the invention has the crossfire tube assembly described above serving a gas turbine having a compressor, a plurality of combustors downstream from the compressor, and a turbine downstream from the plurality of combustors.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
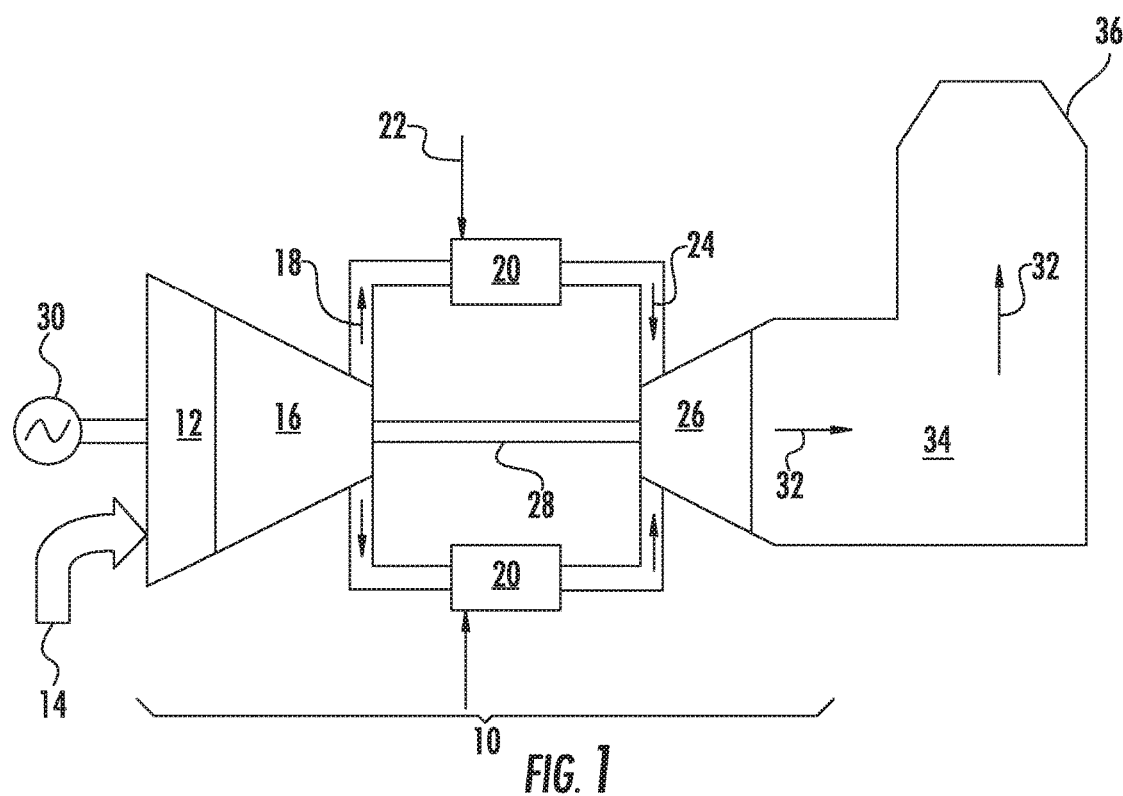
FIG. 1 is a functional block diagram of an exemplary gas turbine within the scope of the present invention.

Repeat use of reference characters in the present specification and drawings is intended to represent the same or analogous features or elements of the present disclosure.

DETAILED DESCRIPTION OF THE DISCLOSURE

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location, importance of the individual components, or specific blade frequencies. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component and/or substantially perpendicular to an axial centerline of the turbomachine, and the term "axially" refers to the relative direction that is substantially parallel and/or coaxially aligned to an axial centerline of a particular component and/or to an axial centerline of the turbomachine, and the term "circumferentially" refers to the relative direction that is substantially parallel to the circumference of a particular component and/or substantially parallel to the turbomachine annular casing element.

Although an industrial or land based gas turbine is shown and described herein, the present disclosure as shown and described herein is not limited to a land based and/or industrial gas turbine unless otherwise specified in the claims. For example, the disclosure as described herein may be used in any type of turbine including but not limited to a steam turbine or marine gas turbine.

A spring loaded, telescoping crossfire tube (XFT) assembly is disclosed with improved component functionality. Instead of a single telescoping flame transmission member that interfaces with both the liner collar and with the mating telescoping member, each member has been separated into at least two pieces with a floating collar and a telescoping sleeve. Field and service conditions may require that each member be separated into more than two pieces. The redistribution of function into separate components allows for a compact inner spring-loaded XFT assembly especially suitable in tight layouts and further enables external assembly of the XFTs to the combustion chamber arrangement. An integral travel guide and locking feature provided by an interlocking raceway on the XFT aids with external XFT assembly. A removable retainer ring aids in installation positioning and servicing. The compact, floating, multipiece, spring-loaded crossfire tube assembly can be used in applications with limited combustor can-to-can clearance. Each traditional XFT member, male and female, is split both physically and functionally into at least a two-piece assembly.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state. The compressed working fluid 18 flows to a combustion section where one or more combustors 20 ignite fuel 22 with the compressed working fluid 18 to produce combustion gases 24 having a high temperature and pressure. The combustion gases 24 flow through a turbine section to produce work. For example, a turbine 26 may connect to a shaft 28 so that rotation of the turbine 26 drives the compressor 16 to produce the compressed working fluid 18. Alternately or in addition, the shaft 28 may connect the turbine 26 to a generator 30 for producing electricity. Exhaust gases 32 from the turbine 26 flow through an exhaust section 34 that may connect the turbine 26 to an exhaust stack 36 downstream from the turbine 26. The exhaust section 34 may include, for example, a heat recovery steam generator (not shown) for cleaning and extracting additional heat from the exhaust gases 32 prior to release to the environment.

Figure 2:
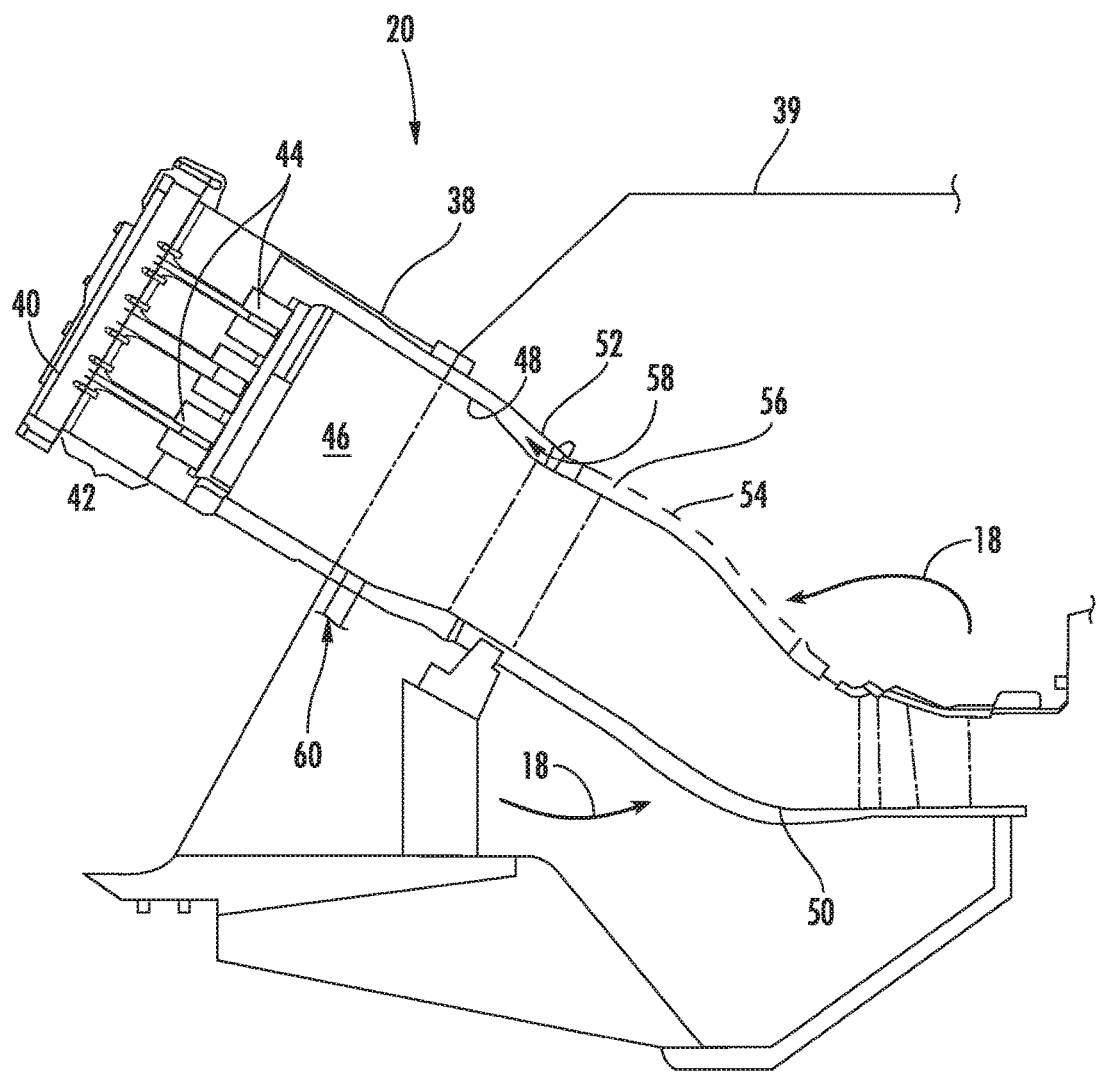
FIG. 2 is a simplified side cross-section view of an exemplary combustor according to various embodiments of the present invention.

The combustors 20 may be any type of combustor employing XFT's known in the art, and the present invention is not limited to any particular combustor design unless specifically recited in the claims. FIG. 2 provides a simplified side cross-section view of an exemplary combustor 20 according to various embodiments of the present invention. A combustor casing 38 circumferentially surrounds at least a portion of the combustor 20 to contain the compressed working fluid 18 flowing from the compressor 16. As shown in FIG. 2, the combustor casing 38 may be connected to or include an end cover 40 that extends radially across at least a portion of each combustor 20. The combustor casing 38 and end cover 40 may combine to at least partially define a head end volume 42 inside each combustor 20. One or more nozzles 44 may be radially arranged in the end cover 40 to supply fuel 22, diluent, and/or other additives to a combustion chamber 46 downstream from the head end volume 42. Possible fuels 22 may include, for example, blast furnace gas, coke oven gas, natural gas, methane, vaporized liquefied natural gas (LNG), hydrogen, syngas, butane, propane, olefins, diesel, petroleum distillates, and combinations thereof. A liner 48 may circumferentially surround at least a portion of the combustion chamber 46, and a transition piece 50 downstream from the liner 48 may connect the combustor 20 to the turbine 26.

A combustor flow sleeve 52 may circumferentially surround at least a portion of the liner 48, and an impingement sleeve 54 with flow holes 56 may circumferentially surround at least a portion of the transition piece 50. The combustor flow sleeve 52 and impingement sleeve 54 combine to define an annular plenum 58 around the liner 48 and impingement sleeve 54. In this manner, the compressed working fluid 18 from the compressor 16 may flow through the flow holes 56 in the impingement sleeve 54 and along the outside of the transition piece 50 and liner 48 to provide convective and/or conductive cooling to the transition piece 50 and liner 48. When the compressed working fluid 18 reaches the head end volume 42, the compressed working fluid 18 reverses direction to flow through the nozzles 44 and into the combustion chamber 46.

Figure 3:
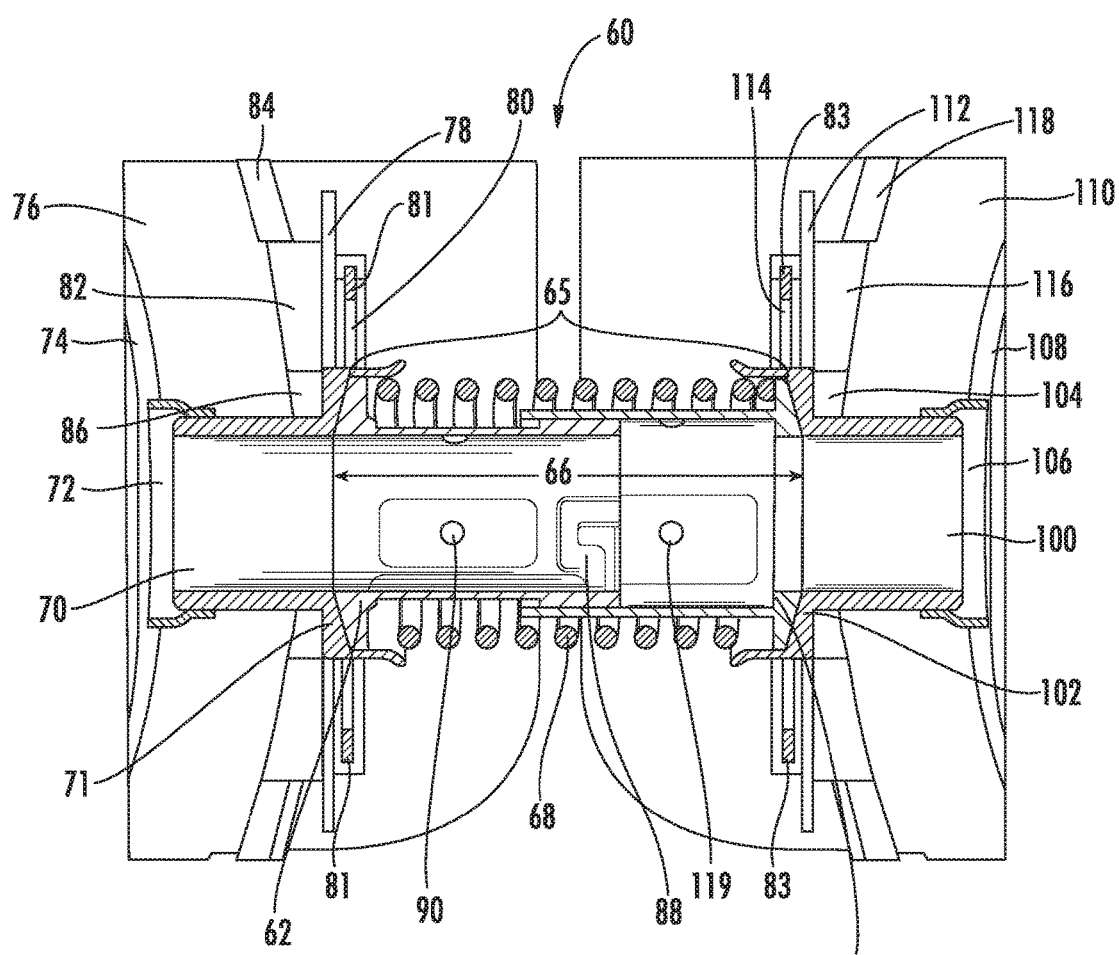
FIG. 3 is a cross section view of a crossfire tube assembly according to one embodiment of the present invention.
Figure 4:
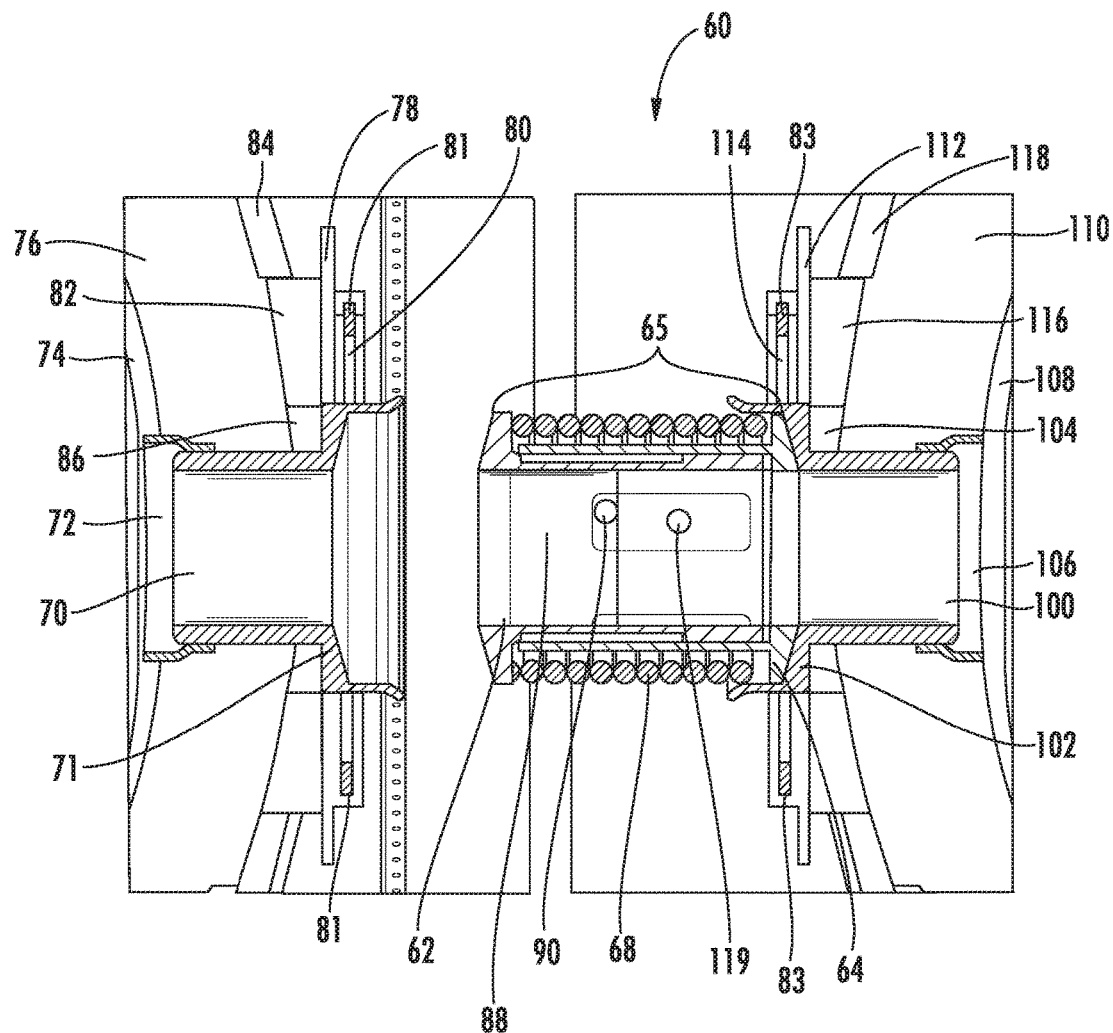
FIG. 4 is a cross section view of the crossfire tube assembly shown in FIG. 3 with the primary body compressed for installation and removal.

As shown in FIG. 2, the combustor 20 further includes a crossfire tube assembly 60 that is positioned inside compressor casing 39 thereby defining the crossfire tube as 'internal', as opposed to 'external'. The internal crossfire tube has no ambient fluid communication and no requirement for bellows or other expandable barrier to isolate the crossfire tube assembly 60 from ambient conditions. FIGS. 3 and 4 provide a cross section view of the crossfire tube assembly 60, in an uncompressed and compressed state respectively, between adjacent combustors 20 according to one embodiment of the present invention. The crossfire tube assembly 60 generally includes a primary body 65 having a first telescoping sleeve 62 and a second telescoping sleeve 64 with a bias 68 or other means for varying a length 66 of the primary body 65. The primary body 65 is structurally independent from all other gas turbine structural elements and is thus easily removed or serviced from outside of the combustors. Also, since the primary body 65 is self-contained having only frictional contact with floating collar annulus' 71, 102 that are positioned essentially parallel with the plane of each of the first and second flow sleeves 84, 118, torque or moment forces from the first and second flow sleeves 84, 118 are minimized. The first and second telescoping sleeves 62, 64, along with the first and second floating collars 70, 100, provide fluid communication between combustion chambers 46 in adjacent combustors 20 to allow combustion in one combustor 20 to readily propagate to the adjacent combustor 20. The first and second telescoping sleeves 62, 64 may be in sliding engagement with one another having axial and circumferential movement guided by an interlocking raceway 88 configured to limit the travel length 66 of the telescoping sleeves 62, 64 and to provide a means for locking the telescoping sleeves 62, 64 to each other while the bias 68 is in a compressed state. Although generally illustrated as a cylindrical tube, one of ordinary skill in the art should readily appreciate that the first and second telescoping sleeves 62, 64 may have any geometric cross-section.

In the particular embodiment shown in FIGS. 3 and 4, the first telescoping sleeve 62, sometimes referred to as the male sleeve, frictionally engages with a first floating collar annulus 71 of a first floating collar 70. The first floating collar 70 extends thorough a first annular passage 86 and is adapted to friction fit into a first liner collar 72 that is attached to the first liner 74 of the first combustor 76. The first floating collar 70 is adapted with a first floating collar flange 78 having a first retainer ring slot 80 configured to house a removable first retainer ring 81. The first retainer ring 81 removably retains the first floating collar 70 in direct contact with a first boss 82 that is coupled with the first flow sleeve 84 and projects radially outward from the first flow sleeve 84 to provide a mating surface for the first floating collar flange 78. The first retainer ring helps hold the first floating collar 70 in position after friction fitting the first floating collar 70 into the first liner collar 72 but the first retainer carries no axial load after the primary body 65 is installed. At least one first purge hole 90 allows fluid communication with the inside the compressor casing.

Continuing with FIGS. 3 and 4, the second telescoping sleeve 64, sometimes referred to as the female sleeve, frictionally engages with a second floating collar annulus 102 of a second floating collar 100. The second floating collar 100 extends thorough a second annular passage 104 and is adapted to friction fit into a second liner collar 106 that is attached to the second liner 108 of the second combustor 110. The second floating collar 100 is adapted with a second floating collar flange 112 having a second retainer ring slot 114 configured to house a removable second retainer ring 83. The second retainer ring 83 removably retains the second floating collar 100 in direct contact with a second boss 116 that is coupled with the second flow sleeve 118 and projects radially outward from the second flow sleeve 118 to provide a mating surface for the second floating collar flange 112. The second retainer ring helps hold the second floating collar 100 in position after friction fitting the second floating collar 100 into the second liner collar 106 but the second retainer carries no axial load after the primary body 65 is installed. At least one second purge hole 119 allows fluid communication with the inside the compressor casing.

In particular embodiments, the first and second liner collars 72, 106 may be welded or otherwise connected to the first and second liners 74, 108 thereby providing a hard-coupled point of the crossfire tube assembly 60. Bosses 82, 116 may be welded or otherwise connected to the first and second flow sleeves 84, 118 thereby providing a second hard-coupled point. The bosses 82, 226 do not participate in active flame transmission, i.e. does not have flame touching it, but they can serve as an axial constraint or seating point for the first and second floating collars 70, 100. In this manner, individual pieces of the multi-piece crossfire tube assembly 60, including first and second floating collars 70, 100 and first and second telescoping sleeves 62, 64, can be unconstrained from movement and can adjust to vibrating and rotational forces imposed on the crossfire tube assembly 60 during operating conditions.

The bias 68, or other means for separating the first and second telescoping sleeves 62, 64, adjusts the length 66 of the primary body 65 to accommodate varying distances and/or vibrations between the adjacent combustors 20. In the particular embodiment shown in FIGS. 3 and 4, the bias 68 is a compression spring that circumferentially surrounds at least a portion of one of the telescoping sleeves 62, 64 and is engaged between the opposing sleeves 62, 64. In this manner the compression spring biases the opposing sleeves 62, 64 away from one another to positively seat the opposing sleeves 62, 64 against the respective floating collar annulus' 71, 102. In other particular embodiments, the structure for separating the sleeves 62, 64 may include a compression bellows, coil, clutch, or other mechanical device known to one of ordinary skill in the art for separating components.

Figure 5:
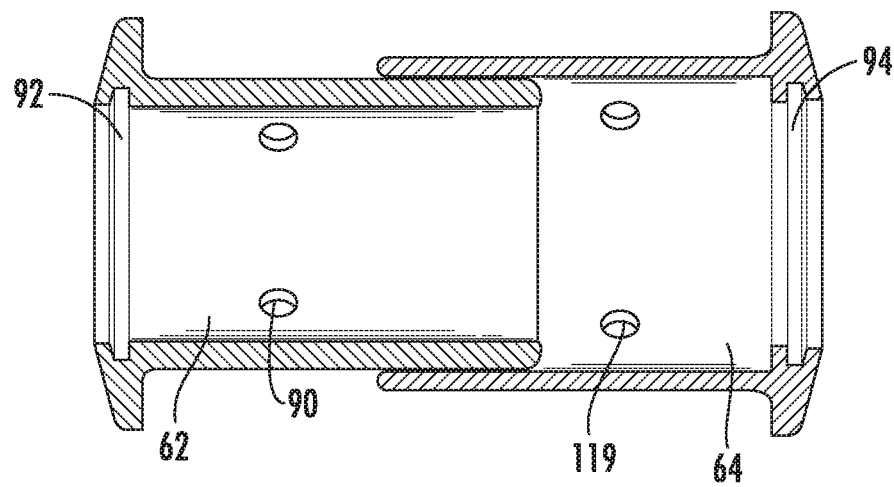
FIG. 5 is a cross section vies of the telescoping sleeves of a crossfire tube assembly according to an alternate embodiment of the present invention.

FIG. 5 provides a plan view of a portion of the crossfire tube assembly 60 according to an alternate embodiment of the present invention. In this particular embodiment, the crossfire tube assembly 60 again includes the telescoping sleeves 62, 64 as previously described with respect to the embodiment shown in FIGS. 3 and 4. In addition, the telescoping sleeves 62, 64 define a first and second internal tooling slot 92, 94 in the sleeves 62, 64, extending circumferentially around the inner surface of the telescoping sleeves 62, 64 to allow for secure tooling engagement with the sleeves 62, 64.

Figure 6:
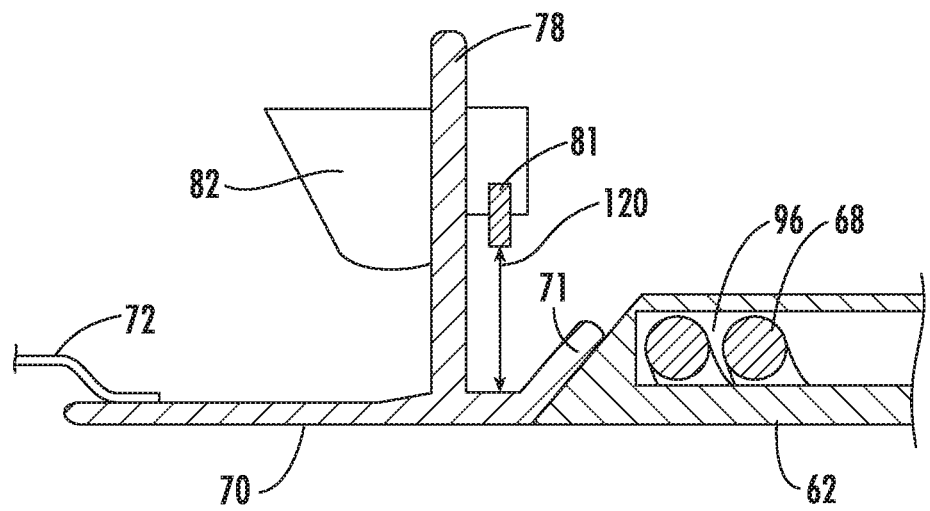
FIG. 6 is a detail view of a friction fit between a primary body and a floating collar annulus according to an alternate embodiment of the present invention.
Figure 7:
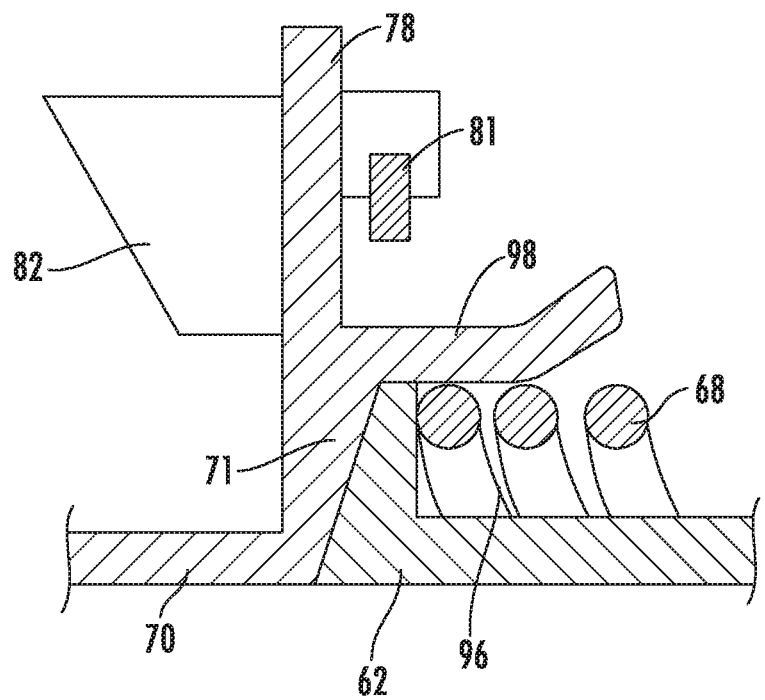
FIG. 7 is a detail view of another friction fit between a primary body and a floating collar annulus according to an alternate embodiment of the present invention.
Figure 8:
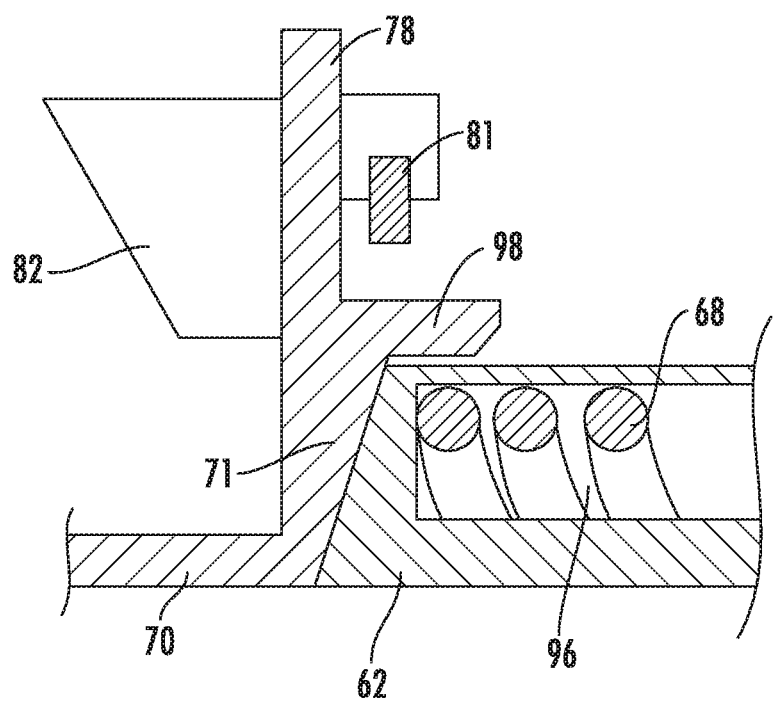
FIG. 8 is a detail view of another friction fit between a primary body and a floating collar annulus according to an alternate embodiment of the present invention.

FIGS. 6-8 provide alternate embodiments for engagement between the telescoping sleeves 62, 64 and the floating collars 70, 100. The frictional interface at the floating collar annulus' 71, 102 can take multiple shapes to best fit field conditions. FIG. 6 shows the annulus 71 with an angled butt interface with the first telescoping sleeve 62 defining a first telescoping sleeve slot 96 for retaining the bias 68 position. This embodiment can reduce the diameter of the boss 82 by minimizing the radial clearance 120 between the first retainer ring 81 and the first floating collar 70. In other words, FIG. 6 embodiment is an example of minimizing flow sleeve boss 82 diameter by minimizing the cross-section at the location controlling boss "float", and minimizing assembly clearance by minimizing floating collar 70 height. FIG. 7 shows the annulus 71 with a first annulus lip 98 extending axially inward to define the first telescoping sleeve slot 96. The first annulus lip 98 flares radially outward at the tip to aid in alignment. This embodiment can enable exterior assembly of the crossfire tube assembly 60. In other words, FIG. 7 embodiment provides some bias piloting and assembly ease (with flared lip feature) at the expense of boss diameter (slightly larger boss). FIG. 8 shows the annulus 71 with a first annulus lip 98 extending axially inward and no flaring. The first telescoping sleeve 62 defines a first telescoping sleeve slot 96 to retain the bias 68 position. FIG. 8 is an example of a more robust spring 68 anchoring/piloting that could be used where boss 82 diameter was not a limiting factor. The boss 82 is shown with a minimal lead-in chamfer, but could also have a more exaggerated flared lip, similar to FIG. 7. FIG. 8 essentially shows an alternate spring 68 retention feature, ostensibly more robust/controlling/limiting, that could be used when boss 82 diameter was not a constraint. The functional split can result in participation of the floating collar in flame transmission and can enable the reduction of boss 82 because the telescoping sleeves 62, 64 no longer engage with the liner collars 72, 106. Thus, the overall sleeve travel 66 can be reduced thereby allowing the telescoping sleeves 62, 64 diameter to be removed (axially) from the annular flow path region.

One of ordinary skill in the art will readily appreciate from the teachings herein that this disclosure enables telescoping, spring-loaded, multi-piece crossfire tubes to be installed in closely-spaced combustor arrangements with minimal clearance. The boss size is minimized for easier packaging and combustor layout. External (to combustor) installation, inspection, and maintenance of the crossfire tube assembly is enabled. Since the first telescoping sleeve 62 is no longer engaged directly with the first liner collar 72, the floating collar size is limited to the length of the annular passage through the combustor thereby eliminating any liner collar-to-floating collar clearance issues driven by telescoping sleeve length. Retainer ring retention of floating collars allows for quick replacement. In addition, the unobstructed internal profile of the floating collars reduces crossfire flow instabilities and undesired wakes and eddies by allowing crossfire flow to fully develop before exiting the crossfire tube assembly. As a result, the crossfire tube assemblies shown in FIGS. 1-8 should preserve and/or improve operability and reliability of the gas turbine combustors by reducing maintenance and unscheduled outages associated with the crossfire tubes and/or trips or forced outages associated with continuous crossfire events.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A crossfire tube assembly between adjacent combustors, the crossfire tube assembly comprising:
   a primary body, comprising:
      a first telescoping sleeve slidably engaged with a second telescoping sleeve to permit relative axial movement, with respect to an axial direction defined by the primary body, between the first telescoping sleeve and the second telescoping sleeve and relative circumferential movement, with respect to a circumferential direction defined by the primary body, between the first telescoping sleeve and the second telescoping sleeve;
      an interlocking raceway configured to limit an axial travel length of the first telescoping sleeve and the second telescoping sleeve with respect to each other and to lock the first telescoping sleeve and the second telescoping sleeve to each other; and
      a biasing element positioned to engage the first telescoping sleeve and the second telescoping sleeve,
   the crossfire tube assembly further comprising:
      a first floating collar removably engaged with the first telescoping sleeve at a first floating collar annulus of the first floating collar;
      a second floating collar removably engaged with the second telescoping sleeve at a second floating collar annulus of the second floating collar;
      a first liner collar disposed between, and in contact with, the first floating collar and a first liner of a first combustor; and
      a second liner collar disposed between, and in contact with, the second floating collar and a second liner of a second combustor,
      wherein the crossfire tube assembly is adapted to provide fluid communication from the first combustor to the second combustor,
      wherein the biasing element is configured to bias the first telescoping sleeve and the second telescoping sleeve away from each other to positively seat the first telescoping sleeve against the first floating collar annulus and positively seat the second telescoping sleeve against the second floating collar annulus, and
      wherein the first floating collar comprises a first flange removably engaged with a first boss of a first flow sleeve of the first combustor, and wherein the second floating collar comprises a second flange removably engaged with a second boss of a second flow sleeve of the second combustor.

2. The crossfire tube assembly as in claim 1, wherein the biasing element comprises a compression spring.

3. The crossfire tube assembly as in claim 1, wherein the biasing element circumferentially surrounds at least a portion of the first telescoping sleeve and/or wherein the biasing element circumferentially surrounds at least a portion of the second telescoping sleeve.

4. The crossfire tube assembly as in claim 1, wherein the first floating collar is adapted to extend through a first annular passage in the first combustor, and wherein the second floating collar is adapted to extend through a second annular passage in the second combustor.

5. The crossfire tube assembly as in claim 1, wherein the first flange comprises a first retainer ring slot, and wherein the second flange comprises a second retainer ring slot.

6. The crossfire tube assembly as in claim 1, wherein the first floating collar annulus is removably engaged with the first telescoping sleeve via an angled butt friction interface, and whereon the second floating collar annulus is removably engaged with the second telescoping sleeve via an angled butt friction fit interface.

7. The crossfire tube assembly as in claim 6, wherein the first telescoping sleeve defines a first telescoping sleeve slot, and wherein the second telescoping sleeve defines second telescoping sleeve slot.

8. The crossfire tube assembly as in claim 1, wherein the first floating collar annulus comprises a first annulus lip, the first annulus lip defining a first telescoping sleeve slot, and wherein the second floating collar annulus comprises a second annulus lip, the second annulus lip defining a second telescoping sleeve slot.

9. The crossfire tube assembly as in claim 8, wherein a ti of the first annulus lip is flared, and wherein a tip of the second annulus lip is flared.

10. The crossfire tube assembly as in claim 1, wherein the first telescoping sleeve defines a first telescoping sleeve slot, and wherein the second telescoping sleeve defines second telescoping sleeve slot.

11. The crossfire tube assembly as in claim 10, wherein the first floating collar annulus comprises a first annulus lip, and wherein the second floating collar annulus comprises a second annulus lip.

12. A gas turbine, comprising:
a compressor;
a plurality of combustors downstream from said compressor;
a turbine downstream from said plurality of combustors;
a crossfire tube assembly between adjacent combustors, the crossfire tube assembly comprising:
a primary body, comprising:
a first telescoping sleeve slidably engaged with a second telescoping sleeve to permit relative axial movement, with respect to an axial direction defined by the primary body, between the first telescoping sleeve and the second telescoping sleeve and relative circumferential movement, with respect to a circumferential direction defined by the primary body, between the first telescoping sleeve and the second telescoping sleeve;
an interlocking raceway configured to limit an axial travel length of the first telescoping sleeve and the second telescoping sleeve with respect to each other and to lock the first telescoping sleeve and the second telescoping sleeve to each other; and
a biasing element positioned to engage the first telescoping sleeve and the second telescoping sleeve,
the crossfire tube assembly further comprising:
a first floating collar removably engaged with the first telescoping sleeve at a first floating collar annulus of the first floating collar;
a second floating collar removably engaged with the second telescoping sleeve at a second floating collar annulus of the second floating collar;
a first liner collar disposed between, and in contact with, the first floating collar and a first liner of a first combustor; and
a second liner collar disposed between, and in contact with, the second floating collar and a second liner of a second combustor,
wherein the crossfire tube assembly is adapted to provide fluid communication from the first combustor to the second combustor,
wherein the biasing element is configured to bias the first telescoping sleeve and the second telescoping sleeve away from each other to positively seat the first telescoping sleeve against the first floating collar annulus and positively seat the second telescoping sleeve against the second floating collar annulus, and
wherein the first floating collar comprises a first flange removably engaged with a first boss of a first flow sleeve of the first combustor, and wherein the second floating collar comprises a second flange removably engaged with a second boss of a second flow sleeve of the second combustor.

13. The gas turbine as in claim 12, wherein the biasing element comprises a compression spring.

14. The gas turbine as in claim 12, wherein the biasing element circumferentially surrounds at least a portion of the first telescoping sleeve and/or wherein the biasing element circumferentially surrounds at least a portion of the second telescoping sleeve.

15. The gas turbine as in claim 12, wherein the first floating collar annulus is removably engaged with the first telescoping sleeve via an angled butt friction interface, and wherein the second floating collar annulus is removably engaged with the second telescoping sleeve via an angled butt friction fit interface.

16. The gas turbine as in claim 12, wherein the first floating collar annulus comprises a first annulus lip, the first annulus lip defining a first telescoping sleeve slot, and wherein the second floating collar annulus comprises a second annulus lip, the second annulus lip defining a second telescoping sleeve slot.

17. The gas turbine as in claim 12, wherein the first telescoping sleeve defines a first telescoping sleeve slot, and wherein the second telescoping sleeve defines a second telescoping sleeve slot, and wherein the first floating collar annulus comprises a first annulus lip, and wherein the second floating collar annulus comprises a second annulus lip.

* * * * *